(12) United States Patent
Ljungkvist

(10) Patent No.: US 8,629,350 B2
(45) Date of Patent: Jan. 14, 2014

(54) PROCESS TURNING DISC WITH A CABLE GUIDE

(71) Applicant: Joachim Ljungkvist, Vasteras (SE)

(72) Inventor: Joachim Ljungkvist, Vasteras (SE)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 13/765,411

(22) Filed: Feb. 12, 2013

(65) Prior Publication Data

US 2013/0168505 A1 Jul. 4, 2013

Related U.S. Application Data

(63) Continuation of application No. PCT/EP2011/074115, filed on Dec. 28, 2011.

(51) Int. Cl.
*H02G 3/04* (2006.01)
*B25J 17/00* (2006.01)

(52) U.S. Cl.
USPC .......................... 174/72 A; 74/490.02; 248/56

(58) Field of Classification Search
USPC .......................... 174/72 A; 74/490.02; 248/56
See application file for complete search history.

(56) References Cited

U.S. PATENT DOCUMENTS

| 5,777,267 A | 7/1998 | Szydel |
| 2005/0011295 A1* | 1/2005 | Shiraki et al. ............... 74/490.02 |
| 2006/0117896 A1* | 6/2006 | Kidooka et al. ............ 74/490.02 |
| 2011/0203402 A1* | 8/2011 | Barkman et al. ........... 74/490.02 |

FOREIGN PATENT DOCUMENTS

| EP | 1666218 A1 | 6/2006 |
| JP | 2003311672 A | 11/2003 |
| JP | 2005288560 A | 10/2005 |
| JP | 2009178828 A | 8/2009 |
| WO | 2010052031 A1 | 5/2010 |

OTHER PUBLICATIONS

International Search Report and Written Opinion of the International Searching Authority Application No. PCT/EP2011/074115 Completed: Mar. 22, 2012; Mailing Date: Apr. 3, 2012 8 pages.

* cited by examiner

*Primary Examiner* — Timothy Thompson
*Assistant Examiner* — Rhadames J Alonzo Miller
(74) *Attorney, Agent, or Firm* — St. Onge Steward Johnston & Reens LLC

(57) ABSTRACT

A process turning disc includes a first flange configured to support a cable package in a first direction and a second flange configured to support a cable package in a second direction opposite to the first direction. A connecting member connected to the first and the second flanges is configured to support a cable package in a third direction perpendicular to the first direction. A cable guide is fastened to the process turning disc in a detachable manner and includes a cable clamp configured to support a cable package in a fourth direction opposite to the third direction. The cable guide further includes two sliding surfaces configured to support a cable package in the first and the second directions outside of the cable clamp. A bending movement of the cable package is thereby allowed in a plane perpendicular to the axis of rotation of the process turning disc.

10 Claims, 4 Drawing Sheets

PROCESS TURNING DISC WITH A CABLE GUIDE

FIELD OF THE INVENTION

The present invention relates to a cable guide attached to a process turning disc in an industrial robot.

BACKGROUND OF THE INVENTION

A process turning disc is a machine part which rotates along with the last axis of an industrial robot and on which a robot tool is mounted. During operation of the robot there are relative movements between a robot arm and the robot tool, and therefore electrical power, pressurized air and any other necessary power source or process fluid is provided to the robot tool via flexible cables and conduits. There typically is a cable package rigidly attached to the robot arm and to the robot tool, but bending and turning more or less freely between the two parts. In order to prolong the service life of the cable package, the bending and turning paths of the same are often constrained in different directions.

A process turning disc may comprise a passage constraining the movement of a cable package between a robot arm and a robot tool as disclosed e.g. in WO2010/052031. In FIG. 6 of WO2010/052031 an embodiment with an open passage for the cable package is shown. In this embodiment a cable clamp is used for preventing the cable package from escaping the passage. However, a cable clamp according to WO2010/052031 exposes the cable package to an extensive wear and is likely to shorten the service life of the same.

SUMMARY OF THE INVENTION

An object of the invention is to provide a process turning disc with improved cable guiding means.

This object is achieved by a process turning disc.

According to a first aspect of the invention there is provided a process turning disc comprising a first flange configured to support a cable package in a first direction, and a second flange configured to support a cable package in a second direction which is opposite to the first direction. A connecting member connected to the first and the second flanges is configured to support a cable package in a third direction which is perpendicular to the first direction. A cable guide is fastened to the process turning disc in a detachable manner and comprises a cable clamp which is configured to support a cable package in a fourth direction which is opposite to the third direction. The cable guide further comprises two sliding surfaces configured to support a cable package in the first and the second directions outside of the cable clamp.

By integrating the sliding surfaces to the detachable cable guide the support for the cable package can be extended outside of the flanges of the process turning disc. These extensions can be made of light-weight material in contrast to heavier material of the process turning disc itself.

According to one embodiment of the invention the first direction is parallel with an axis of rotation of the process turning disc. With this configuration the cable package bends in a plane perpendicular to the axis of rotation of the process turning disc and the bending movement is thereby facilitated.

According to one embodiment of the invention the sliding surfaces extend over a sector of at least 30 degrees, such as at least 50 degrees or at least 70 degrees, about the axis of rotation of the process turning disc. Sliding surfaces extending over a large sector support the cable package over a large range of bending movement and improves thereby the guiding properties of the cable guide.

According to one embodiment of the invention the cable guide comprises a back rest for constraining bending of a cable package away from the connecting member, and a curved surface between the cable clamp and the back rest with a radius of curvature of at least 10 mm, such as at least 20 mm or at least 30 mm. The back rest together with the curved surface limit the bending curvature of the cable package and prolongs thereby the service life of the same.

According to one embodiment of the invention an industrial robot comprises a process turning disc according to any of the preceding embodiments. The process turning disc described hereinbefore is especially adapted to be used on a last axis of an industrial robot between a gear box of the last axis motor and a robot tool.

According to one embodiment of the invention the first direction is parallel with a last robot axis. With this configuration the cable package bends in a plane perpendicular to the last robot axis and the bending movement is thereby facilitated.

According to one embodiment of the invention the industrial robot further comprises a flexible cable package. The process turning disc described hereinbefore is especially adapted for guiding a flexible cable package between a robot arm and a robot tool.

According to one embodiment of the invention the cable clamp presses the cable package against the connecting member such that a section of the cable package becomes fixedly attached to the process turning disc. By this measure a movement of the cable package in a longitudinal direction of the same in relation to the cable clamp is prevented. This is likely to prolong the service life of the cable package.

According to one embodiment of the invention the industrial robot further comprises a roller arranged around the cable package and being rotatable in relation to the same. The roller protects the cable package from direct contact with surrounding robot parts and facilitates the movements of the cable package by rolling against any robot parts it comes into contact with.

According to one embodiment of the invention the roller is configured to interact with the sliding surfaces. The roller rolls against the sliding surfaces of the cable guide and facilitates thereby the bending movement of the cable package. At the same time the roller protects the cable package from direct contact against the sliding surfaces.

BRIEF DESCRIPTION OF THE DRAWINGS

The invention will be explained in greater detail with reference to the accompanying drawings, wherein.

DETAILED DESCRIPTION OF THE INVENTION

Figure 1:
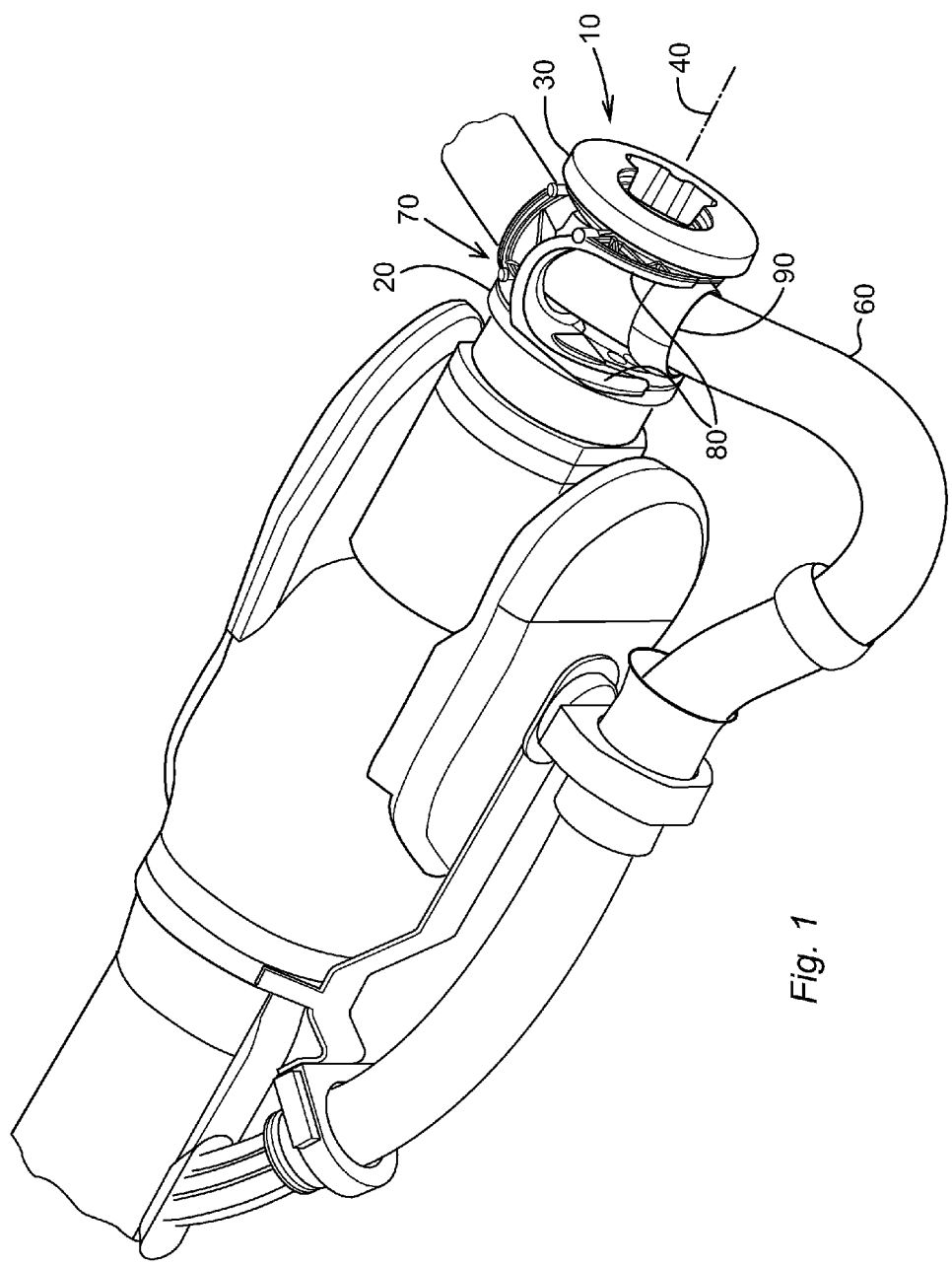
FIG. 1 shows a robot arm according to one embodiment of the invention.
Figure 2:
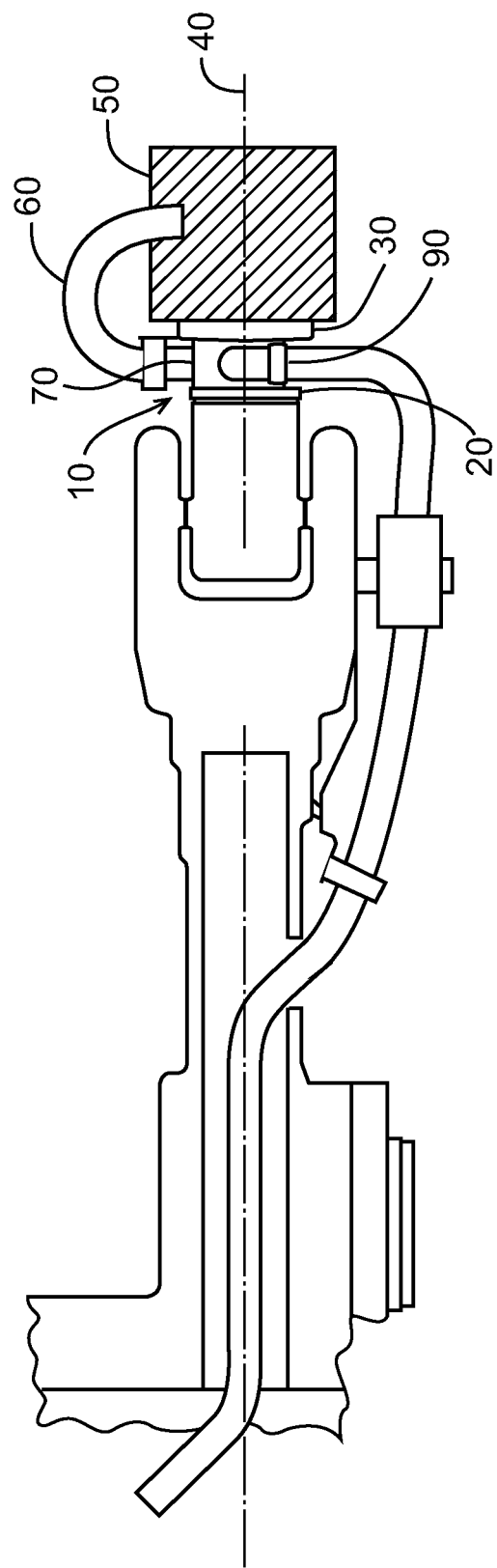
FIG. 2 shows a schematic presentation of a robot arm according to one embodiment of the invention.

FIG. 1 shows an arm and a wrist of a six axis industrial robot, and FIG. 2 shows a schematic presentation of the same. A first flange 20 of a process turning disc 10 is mounted directly on a gear box of the last robot axis, in the present case the sixth robot axis 40, and a robot tool 50 is mounted on a second flange 30 of the process turning disc 10. Between the first and the second flanges 20, 30 there is formed a passage through which a cable package 60 passes on its way from the robot arm to the robot tool 50. A cable guide 70 prevents the cable package 60 from escaping the passage by clamping the cable package 60 against a connecting member between the first and the second flanges 20, 30. On the other hand the cable guide 70 allows bending of the robot arm side of the cable package 60 within certain limits in a plane perpendicular to the sixth robot axis 40. The cable guide 70 comprises two sliding surfaces 80 which support the cable package 60 in the direction of the sixth robot axis 40 under bending movement of the cable package 60. Around the cable package 60 there is provided a roller 90 which rotates freely in relation to the cable package 60 and rolls against the sliding surfaces 80 to therefore facilitate the bending movement of the cable package 60.

Figure 3B:
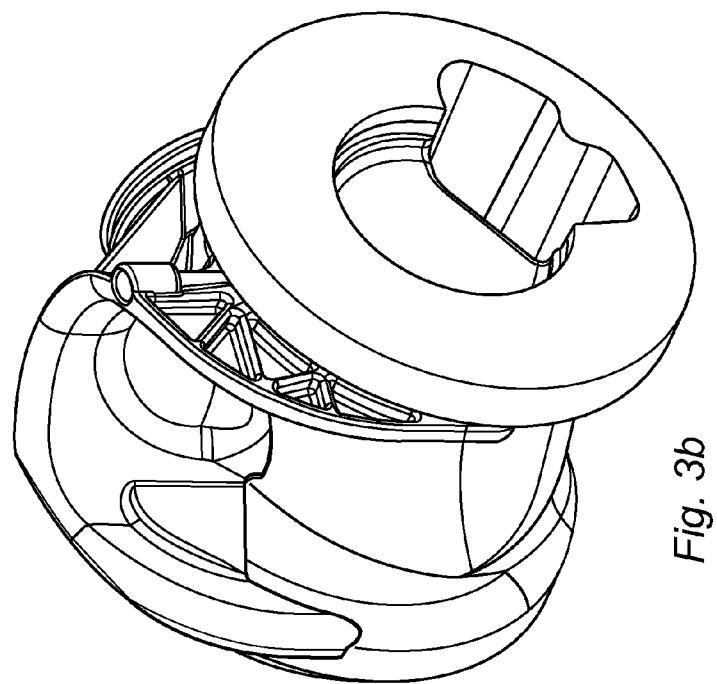
FIGS. 3a-b shows an isometric view of a process turning disc with a cable guide according to one embodiment of the invention.
Figure 3A:
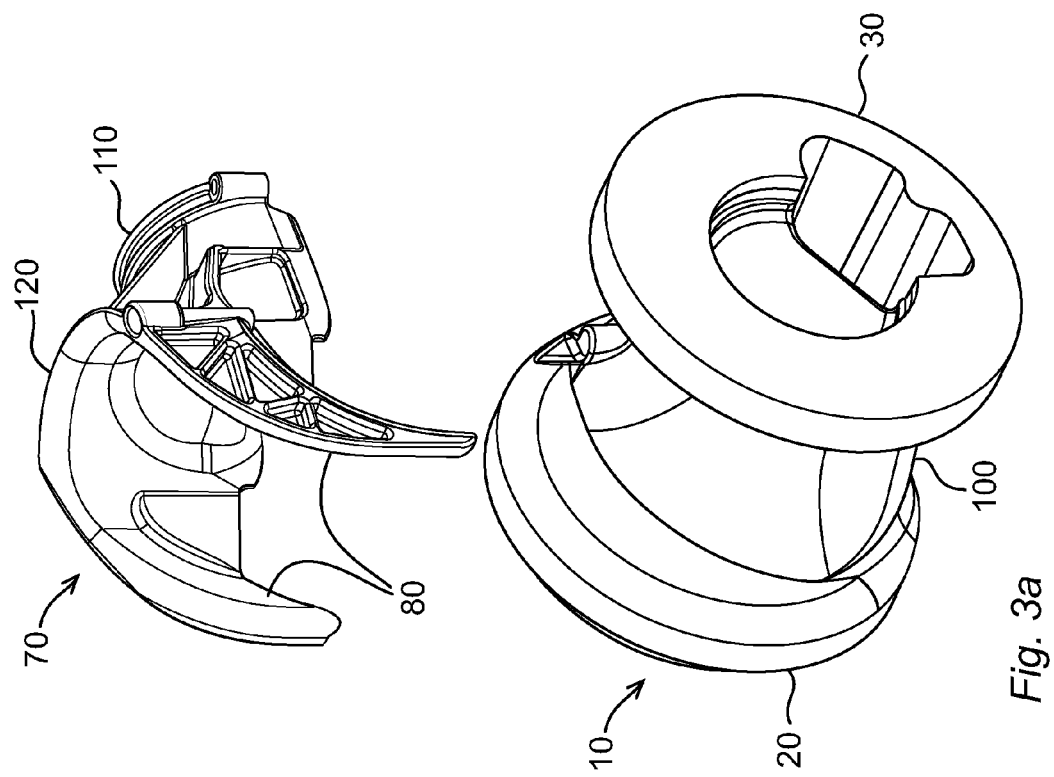

Referring to FIG. 3, a process turning disc 10 together with a detachable cable guide 70 are shown in more detail. A connecting member 100 connects the first and the second flanges 20, 30 of the process turning disc 10 together to form a discrete unit. The connecting member 100 is formed such that a free space is left between the first and the second flanges 20, 30 to receive the cable package 60. The first flange 20 constrains the movement of the cable package 60 in a first direction towards the robot arm while the second flange 30 constrains the movement of the cable package 60 in a second direction towards the robot tool 50. The connecting member 100 constrains the movement of the cable package 60 in directions perpendicular to the first and the second directions when the cable package 60 is bent against the connecting member 100.

When the cable package 60 is bent away from the connecting member 100 the cable guide 70 prevents the cable package 60 from escaping the passage between the first and the second flanges 20, 30. In one end of the cable guide 70 a cable clamp 110 presses the cable package 60 against the connecting member 100 such that a section of the cable package 60 becomes fixedly attached to the process turning disc 10. In the opposite end of the cable guide 70 two sliding surfaces 80 support the cable package 60 in the direction of the sixth robot axis 40 when the cable package 60 bends in a plane perpendicular to the sixth robot axis 40. Finally a back rest 120 integrated to the cable guide 70 constrains the bending of the cable package 60 away from the connecting member 100. That is, the bending movement of the cable package 60 in the plane perpendicular to the sixth robot axis 40 is constrained at one extreme by the connecting member 100 and at the other extreme by the back rest 120. Between these two extremes the cable package 60 can bend freely.

Between the cable clamp 110 and the back rest 120 the cable guide 70 comprises a curved surface with a relatively large radius of curvature configured to support the cable package 60 under bending of the same towards the back rest 120. The radius of curvature of this surface is preferably at least 10 mm, such as at least 20 mm or at least 30 mm.

Figure 4:
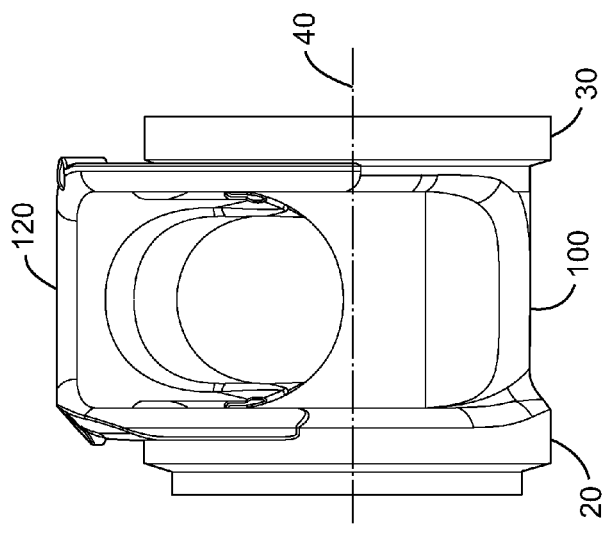
FIG. 4 shows two side views and a top view of a process turning disc with a cable guide according to one embodiment of the invention.
Figure 4:
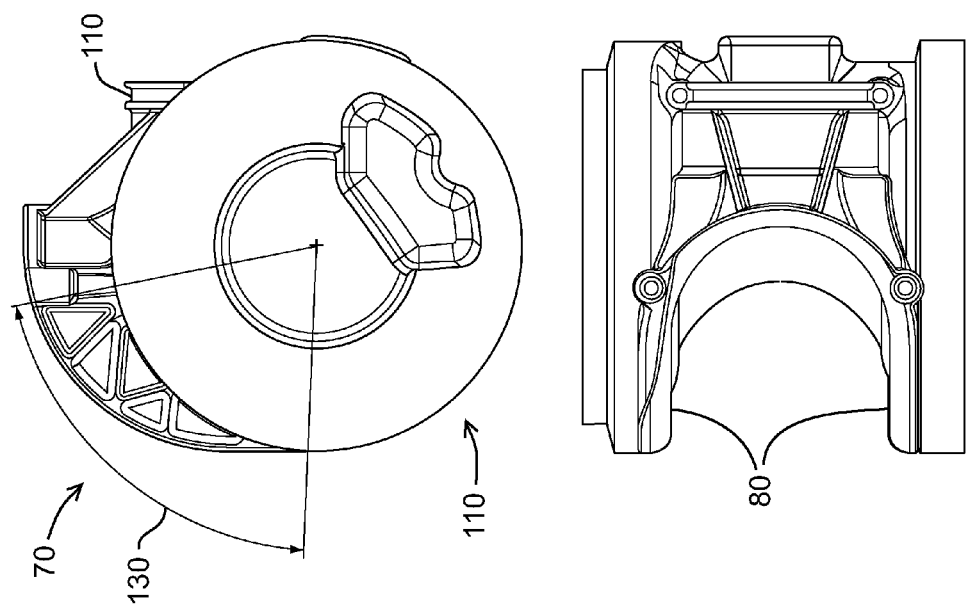

Referring to FIG. 4, the sliding surfaces 80 of the cable guide 70 extend over a sector 130 of about 75 degrees about the axis of rotation of the process turning disc 10. As is clear from the description hereinbefore, in the case of the present embodiment the axis of rotation of the process turning disc 10 coincides with the sixth robot axis 40.

The cable guide 70 may preferably be made of aluminium while the process turning disc 10 may be made of cast iron. The sliding surfaces 80 of the cable guide 70 are actually extensions of corresponding sliding surfaces integrated into the process turning disc 10. It is advantageous to provide these extensions in a separate part instead of making the process turning disc 10 itself more complicated and heavy. The light-weight material used for the sliding surfaces 80 decreases the overall weight of the cable guiding means.

The invention is not limited to the embodiments shown above, but the person skilled in the art may modify them in a plurality of ways within the scope of the invention as defined by the claims.

What is claimed is:

1. A process turning disc comprising: a first flange configured to support a cable package in a first direction, a second flange configured to support a cable package in a second direction which is opposite to the first direction, a connecting member connected to the first and the second flanges and configured to support a cable package in a third direction which is perpendicular to the first direction, a cable guide fastened to the process turning disc in a detachable manner and comprising a cable clamp which is configured to support a cable package in a fourth direction which is opposite to the third direction,
   characterized in that the cable guide further comprises two sliding surfaces configured to support a cable package in the first and the second directions outside of the cable clamp.

2. The process turning disc according to claim 1, wherein the first direction is parallel with an axis of rotation of the process turning disc.

3. The process turning disc according to claim 1, wherein the sliding surface extend over a sector of at least 30 degrees about the axis of rotation of the process turning disc.

4. The process turning disc according to claim 1, wherein the cable guide comprises a back rest for constraining bending of a cable package away from the connecting member, and a curved surface between the cable clamp and the back rest with a radius of curvature of at least 10 mm.

5. An industrial robot comprising a process turning disc according to claim 1.

6. The industrial robot according to claim 5, wherein the first direction is parallel with a last robot axis.

7. The industrial robot according to claim 5 further comprising a flexible cable package.

8. The industrial robot according to claim 7, wherein the cable clamp presses the cable package against the connecting member such that a section of the cable package becomes fixedly attached to the process turning disc.

9. The industrial robot according to claim 7 further comprising a roller arranged around the cable package and being rotatable in relation to the same.

10. The industrial robot according to claim 9, wherein the roller is configured to interact with the sliding surfaces.

* * * * *